PHONOGRAPHIC RECORDING AND REPRODUCING DEVICE

Filed Oct. 9, 1946 2 SHEETS—SHEET 1

CHARLES HUENLICH, INVENTOR
HEINRICH F.M. GRAMANN, INVENTOR DECEASED
HARRIET GRAMANN SCHWARZ, EXECUTRIX
By Henry Lanahan
ATTORNEY

PHONOGRAPHIC RECORDING AND REPRODUCING DEVICE

Filed Oct. 9, 1946 2 SHEETS—SHEET 2

CHARLES HUENLICH, INVENTOR
HEINRICH F. M. GRAMANN, INVENTOR DECEASED
HARRIET GRAMANN SCHWARZ, EXECUTRIX

By Henry Lanahan
ATTORNEY

UNITED STATES PATENT OFFICE 2,603,491

PHONOGRAPHIC RECORDING AND REPRODUCING DEVICE

Charles Huenlich, Bloomfield, N. J., and Heinrich F. M. Gramann, deceased, late of Orange, N. J., by Harriet Gramann Schwarz, executrix, Orange, N. J., assignors to Thomas A. Edison, Incorporated, West Orange, N. J., a corporation of New Jersey Application October 9, 1946, Serial No. 702,116

12 Claims. (Cl. 274—30)

This invention relates to translating devices for phonographs of the dictating-machine type, and more particularly to such translating devices which are selectively adjustable into recording and reproducing conditions.

It is an object of our invention to provide an improved mounting for such devices by which the translating units thereof may be shifted to engage the styli selectively with the record.

It is another object to provide an improved biasing system which is adapted to decrease the pressure of the translating unit on the record when the device is conditioned for recording and to increase this pressure when the device is conditioned for reproducing. Especially, in this respect, it is an object to provide such biasing system which includes an element serving as a biasing and counterbiasing means as the device is shifted into its respective conditions. Another object is to provide such a biasing system wherein biasing and counterbiasing weights are at the side of the unit from its pivot axis.

It is another object to provide a sliding frictional contact between the translating unit and a relatively stationary member for damping the unit from unwanted vibration relative to the record, and it is a further object to provide a novel and simplified arrangement of such damping means with a counterbiasing means for the unit. Particularly, it is an object to apply counterbiasing pressure to the translating unit through a resilient member and to provide the damping by a sliding frictional contact of a counterbiasing element with this spring member.

Further objects are to provide a novel mechanism for raising and lowering the translating unit from and onto the record, and to provide a novel timing relationship of such mechanism with the means for shifting the unit across the record.

Still further objects of our invention lie in the combinations of elements and arrangements of parts illustrated in the embodiments of our invention herein particularly shown and described, and will be hereinafter apparent.

In the description of our invention reference is had to the accompanying drawings, of which:

Figures 7, 8, 9, 10, 11, 12:
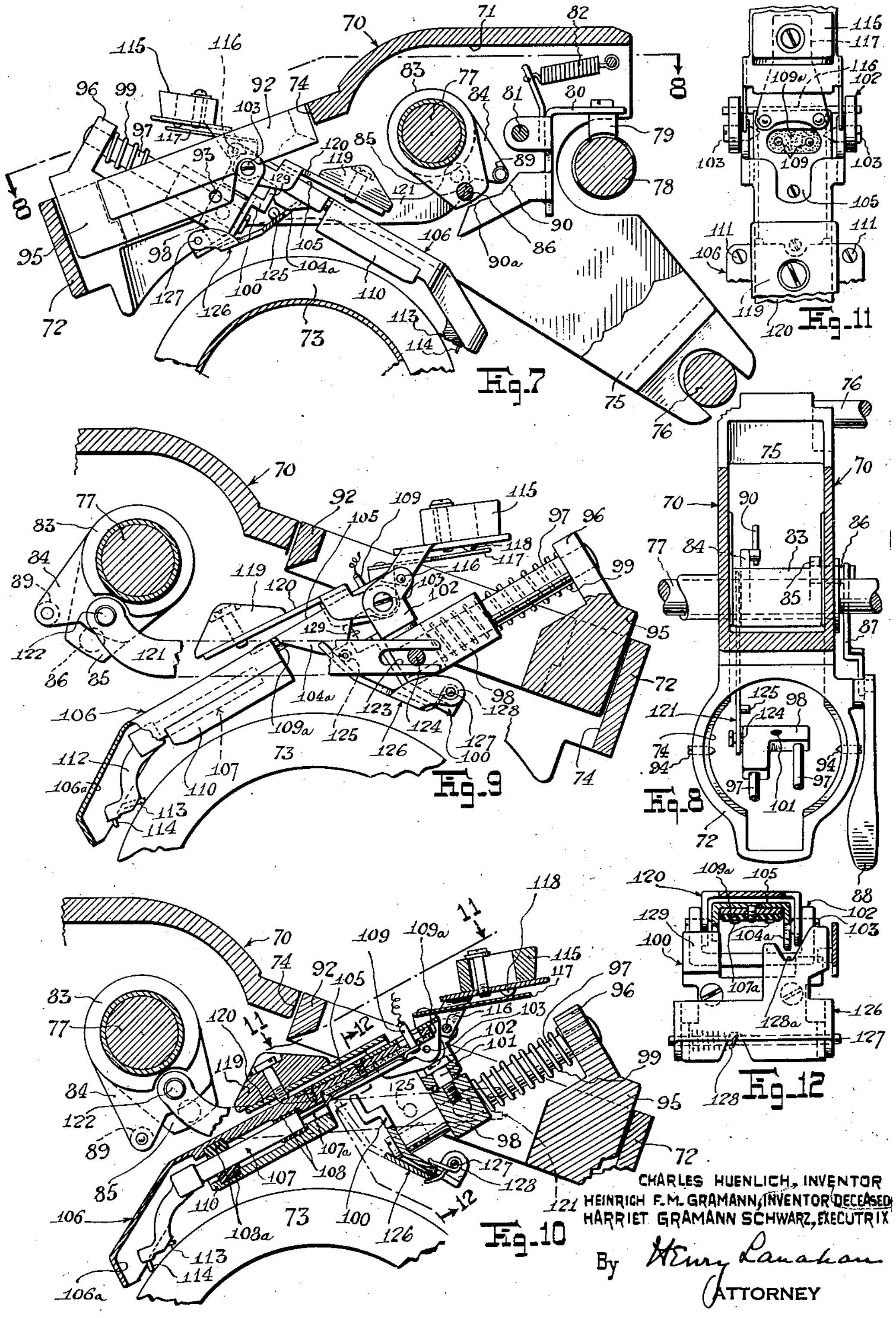
Figure 7 is a righthand view, partly in elevation and partly in section, showing a second embodiment of a translating device, mounted on a standard phonograph carriage, according to our invention.
Figure 8 is a fractional section on the line 8—8 of Figure 7.
Figure 9 is a fractional view partly in elevation and partly in section showing parts of this second embodiment in the positions they occupy when the device is conditioned for recording.

Figure 10 is a view similar to Figure 9 showing showing the device in reproducing condition; and Figures 11 and 12 are fractional sections on the lines 11—11 and 12—12, respectively, of Figure 10.

Figures 1, 2, 3, 4, 5, 6:
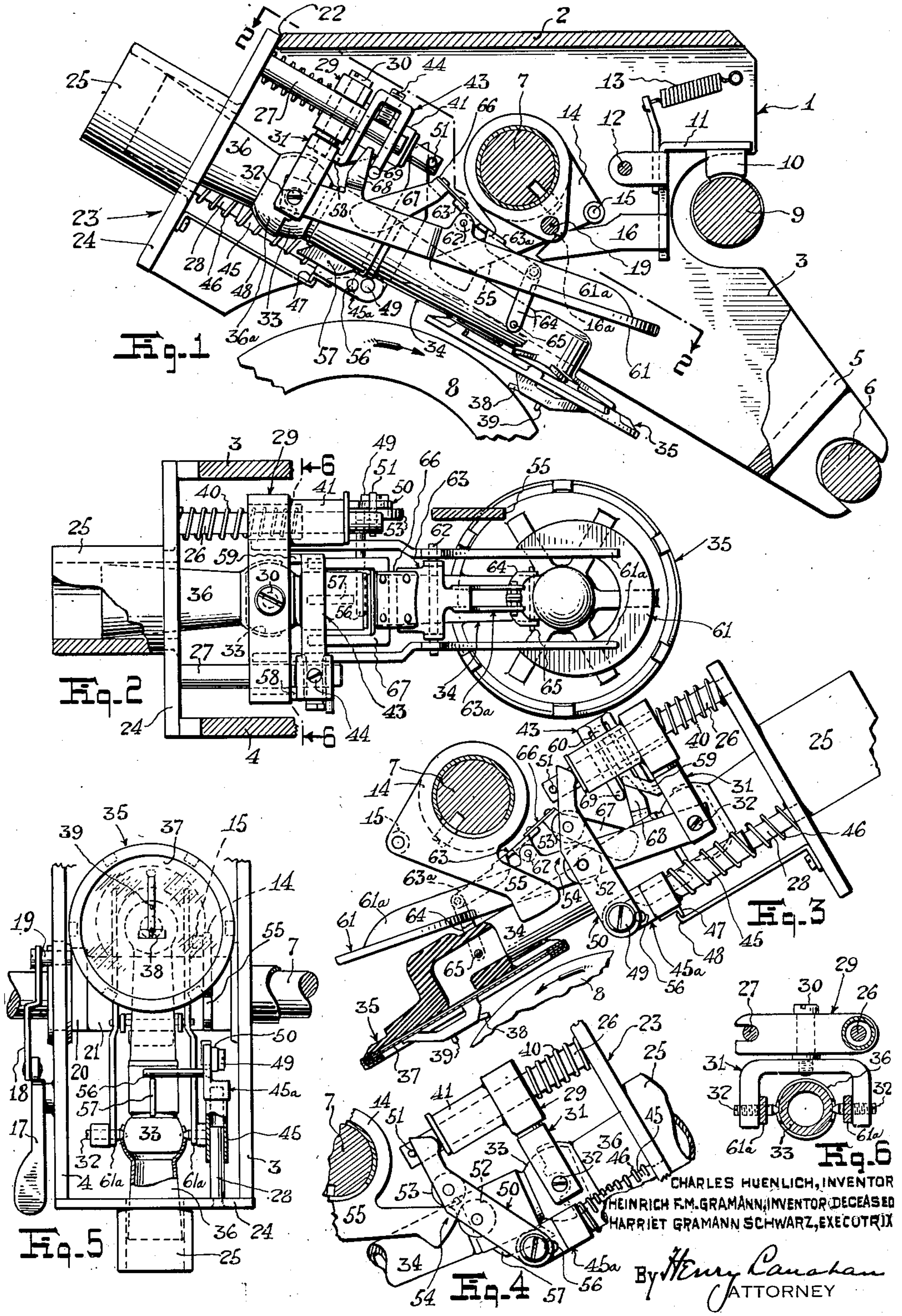
Figure 1 is a righthand view, partly in elevation and partly in vertical section, showing one phonographic translating device according to our invention.
Figure 2 is a partial section on the line 2—2 of Figure 1.
Figure 3 is a fractional lefthand elevation of this translating device, with parts broken away, showing the device in recording condition.
Figure 4 is a fractional view similar to Figure 3 showing certain parts of the device in the positions they occupy when the device is in neutral condition.
Figure 5 is a bottom plan view of the translating device with parts broken away.
Figure 6 is a fractional section on the line 6—6 of Figure 2.

Reference being had to Figures 1, 2 and 5, there will be seen a phonograph carriage 1 which is a hollow rectangular housing suitably made by casting and suitably having a flat upper side 2 and vertical left and right sides 3 and 4. At the rear of the carriage there is a depending arm 5 terminating in a forked portion which slidably engages a cross rod 6. At its center the carriage is mounted slidably on a second cross rod 7. These two cross rods provide a mounting to permit traveling movement of the carriage along a record 8, this record being typically a "wax" record of cylindrical shape. This traveling movement is produced by a feed screw 9 to which the carriage is releasably coupled by a rockably-mounted feed nut 10 mounted on a bracket 11 that is pivoted at 12 to the carriage, this feed nut being spring-urged into engagement with the feed screw by a spring 13 connected to the bracket.

The release of the feed nut is controlled by a collar 14 that is mounted on the rod 7 within the carriage and which carries a roller 15 that coacts with a cam arm 16 of the bracket to turn the bracket as the collar is turned. This collar is typically controlled by a hand lever 17 pivoted to the right side of the carriage and connected by way of a link 18, stud 19, collar 20 and sleeve 21 to the collar 14 (see Figures 1 and 5). It is by this lever that the translating device is placed selectively into recording, neutral and reproducing conditions, wherefore the lever is referred to as having recording, neutral and reproducing positions respectively. When the control lever is in recording position the roller 15 is free from the arm 16 and the feed nut is held engaged by the spring 13. As the lever 17 is turned to neutral position the roller rides onto the cam 16 and turns the bracket to disengage the feed nut, and as the lever is turned to reproducing position the roller rides off the end of the cam so that the feed nut is reengaged by the spring 13. In the intermediate or neutral position of the lever the same is detented by the engagement of the roller 15 with a notch 16*a* in the cam 16. Upon the return of the lever to recording position, the same sequence of operations occurs: the feed nut being disengaged as the lever reaches neutral position and being reengaged as the lever reaches recording position.

The carriage has an opening 22 at the front in which there is mounted a frame 23 for the translating device. This device is shown as being of the acoustical type but no unnecessary limitation of our invention as to the type—that is, acoustical or electrical—is intended. This frame comprises a plate 24 which overlies the opening and is held by screws (not shown) to the carriage. Secured into a central opening of this plate is a forwardly-extending tube 25 for conveying sound to and from the device. This frame plate 24 carries three mounting rods which extend inwardly in directions across the record 8, there being left and right rods 26 and 27 at the top and one left rod 28 at the bottom. Mounted on the top rods is a slide 29 and secured to the center of this slide by the pivot 30 is a gimbal frame 31 (see Figure 6). This gimbal frame carries a pair of cone pivots 32 on a horizontal axis parallel with the record. These pivots engage diametrically opposite points of a semispherical head 33, which is provided at the end of a tube 34 that leads to a sound box 35. Pivotally embracing the head 33 is a semispherical head 36*a* which constitutes one end portion of a flared tube 36. The other end of this tube slidably fits into the tube 25.

The sound box 35 comprises a hollow casing made suitably of thermosetting plastic and having the usual circular hollow portion closed by a diaphragm 37. On this diaphragm there is mounted a stirrup carrying recording and reproducing styli 38 and 39 spaced from one another in the direction of movement of the slide 29 on the frame 23.

The slide 29 is urged rearwardly by a compression spring 40 which is located on the rod 26 between the frame plate 24 and the slide 29, there being a sleeve 41 on the slide which embraces the rod 26 and is provided with a cavity receiving one end of the spring 40 so that the spring may have a greater length. The rearward portion of the slide is defined by its abutment against an inverted U-bracket 43 secured by a screw 44 to the rod 27. In this rearward position of the slide the sound box is in recording position wherein its recording stylus 38 engages the record 8. As the control lever 17 is moved from recording to reproducing position the sound box is moved upwardly from the record, then shifted forwardly across the record and next lowered to bring the reproducing stylus into engagement with the record as is herein next described.

Mounted slidably on the lower mounting rod 28 is a sleeve 45 (Figure 3) which is urged rearwardly by a compression spring 46 on the rod 28 and interposed between a head 45*a* on the sleeve and the frame plate 24, the rearward position of the sleeve being defined by the abutment of a lug 47, carried by the head 45*a*, against a stop 48 mounted on the frame plate. Pivoted at 49 to the head 45*a* is an upstanding arm 50 the upper end of which lies between the inner end of the sleeve 41 and a cross pin 51 in the mounting rod 26 (Figure 3). Mounted fixedly on the central portion of this arm are two small disks 52 and 53 which are located one above the other lengthwise of the arm to provide a cam face having a central notch 54. Provided integrally on the collar 14 is an arm 55 which lies in the medial plane of these disks. The arm 55 is free from the disks when the control lever 17 is in recording position, but is moved against the lower disk 52 into the notch 54 (Figure 4) as the control lever is moved into neutral position. As the arm 55 is moved against the lower disk 52 the head 45*a* is moved rearwardly to bring the sleeve 45 substantially against the frame plate but the slide 29 is not moved partly because the disk 52 is at the lower half portion of the arm and partly because the spring 46 is weaker than the spring 40. Carried by the head 45*a* is a cross pin 56 which forms a cam element that lies directly below the tube 34 of the sound box. On the lower side of the sound tube there is a depending rib 57 which forms a second cam element. This rib lies just ahead of the pin 56 when the device is in recording condition but as the pin is moved forwardly in response to the movement of the control lever 17 into neutral position it engages the rib and cams the sound box upwardly to lift the recording stylus from the record.

As the control lever is moved from neutral to reproducing position the arm 55 is moved against the upper roller 53 to push the slide 29 rearwardly (for the pivot 49 of the arm 50 is now held stationary by the abutment of the sleeve 45 against the frame plate 24). As the slide is so moved rearwardly the sound box is carried therewith and, concurrently, the rib 57 is moved off the pin 56 into the relative position thereto which it initially had when the device was in recording condition. Thus, the sound box is shifted forwardly relative to the record and then lowered to place the reproducing stylus 39 into contact with the record.

As the control lever is returned from reproducing to recording position the above-described operations occur in the reverse sequence: the sound box being raised and concurrently shifted rearwardly as the lever is moved to neutral position and then being lowered as the lever is returned to recording position.

When the sound box is in a rearward position with the recording stylus in engagement with the record, the gimbal 31 is held centered against pivotal movement on the pivot 30, to lock the sound box in a centered position against lateral play relative to the record, by pressure of the right side of the gimbal against a lug 58 on the bracket 43 (Figure 1) and by pressure of the left side of the gimbal against a depending lug 59 on a lateral arm 60 of the bracket 43, the pressure being provided by the spring 40 acting against the slide 29. When the slide is in a forward position to place the translating device in reproducing condition, however, the gimbal is free to turn on the pivot 30 to afford the sound box a lateral freedom of movement so that it may readily track the groove of a record.

Overlying the sound box is a biasing weight 61 having two arms 61*a* pivoted on the pivots 32. This weight has an up-and-down freedom of movement relative to the sound box but is held fixed with respect thereto in directions lateral of the record. Pivoted between the arms 61a at 62 is a lever 63 having a forked end 63a coupled by a link 64 to the sound box, the link having a lower forked portion that straddles the rearward end of the tube 34 and being pivoted thereto at 65. Hinged by a flat spring 66 to the forward end of the lever 63 is a U-shaped counterweight 67 which straddles the forward portion of the tube 34.

When the translating device is in recording condition the weight 61 is held in a raised ineffective position by the abutment of an upstanding finger 68 on one of the arms 61a with a lateral finger 69 on the bracket 43 (Figure 1). The counterweight 67 is now effective to relieve part of the weight of the sound box from the record. This is a desirable result because it permits the sound box to be made of a sturdy construction while not exceeding the desired biasing pressure of the recording (cutting) stylus on the record. As the sound box is shifted forwardly to place the translating device in reproducing condition the finger 68 is moved free from the finger 69 and the weight 61 is lowered so that it rests on the sound box to augment the pressure of the latter on the record. At the same time, the counterweight 67 is disabled as a counterbiasing means but adds instead its weight to that of the weight 61 to increase still further the biasing pressure of the reproducing stylus on the record. Thus the function of the counterweight 67 is reversed as the device is shifted between recording and reproducing conditions. Also, there is the feature that both biasing weights 61 and 67 are at the same side of the pivot axis of the sound box as is the sound box itself. This is a desirable feature in that it tends towards a greater compactness of structure.

Because the translating device is shown positioned above the record the desired biasing pressure of the respective styli on the record is obtained from the weights of the sound box and biasing elements 61 and 67. However, it will be understood that the biasing system which we provide is not necessarily limited to biasing elements which are actuated by the gravitational force thereon.

In Figures 7 through 12 there is shown another embodiment of our invention in which the translating unit of the device is mounted similarly to the foregoing embodiment. This embodiment is adapted for installation in a phonograph carriage 70 of the form commonly employed in standard dictating machines. This carriage comprises a casting having a hollow rearward portion 71 and a forwardly-extending arm 72 which overlies a record 73 and is provided with a mounting hole 74 for the translating device. Extending rearwardly and downwardly from the hollow portion 71 is an arm 75 which has a forked end that is mounted slidably on a cross rod 76. At the center of the portion 71 the carriage is traversed by and mounted slidably on a second cross rod 77, and at the rear of the carriage there is a feed screw 78 for driving the carriage along the record. This feed screw is engaged releasably by a feed nut 79 carried by a bracket 80 that is pivoted at 81 to the carriage and urged by a spring 82 so as to normally hold the nut engaged. On the cross rod 77 within the carriage there is a bushing 83 provided with collars 84 and 85 at its ends. The right collar 85 carries a stud 86 coupled by a link 87 to a hand lever 88 that is pivoted to the right side of the carriage arm 72 (Figure 8). The left collar 84 carries a roller 89 which acts against a cam face 90 provided on an arm of the bracket 80 to control the feed nut. Since the hand lever 88 is the means for placing the translating device into recording, neutral and reproducing conditions, as is hereinafter described, it may be referred to as having respective recording, neutral and reproducing positions. In its recording position the roller 89 is free from the cam face 90 and the feed nut is held engaged with the feed screw. As the hand lever is moved from recording to neutral position the roller is moved against the cam face, into a detent 90a, to disengage the feed nut, and as the lever 88 is moved forwardly into reproducing position the roller is moved free from the cam face to cause the feed nut to be reengaged.

The translating device has a ring-shaped frame 92 which seats in the mounting hole 74, the frame having two holes 93 engaged by screws 94 that thread through the wall of the carriage arm 72 to hold the translating device in place. The frame 92 has a forward rectangular extension 95 provided at the top with a rearwardly-inclined standard 96. Secured to this standard are two left and right mounting rods 97 and 97a respectively which extend obliquely through the frame 92 in directions across the record 73. Mounted on these rods is a slide 98 having a long bearing on the left rod 97 and a relatively short bearing on the right rod 97a (Figure 8), the right bearing being short to accommodate a relatively long compression spring 99 on the right rod. This spring urges the slide rearwardly into a terminal position defined by the abutment of the slide against a bracket 100 that is secured by screws to the ends of the rods.

Pivotally held by a pivot stud 101 to the slide is an upstanding U-shaped gimbal 102 which carries horizontally-aligned cone pivots 103. These cone pivots engage respective holes in the turned-down sides 104 of a narrow end portion 105 of a channel-shaped housing 106 for a translating unit 107. The housing extends rearwardly from its pivot axis across the record 73 and carries the translating unit at its central portion. This unit is, by way of illustration, an electrical one of the crystal type. It may comprise for example a Rochelle salts beam clamped between two rubber pads 108 at its base and two relatively compact rubber pads 108a near its "free" end, the damping being produced by means of a metal plate 110 below the housing which is secured thereto by screws 111. This unit has lead wires 107a which connect to a pair of terminals 109 that are mounted on an insulating plate 109a. This insulating plate is secured to the under side of the end portion 105 of the frame 106. At the free end of the translating unit the housing has a downwardly-inclined "nose" portion 106a within which there is a stylus holder 112 secured to the crystal beam and carrying recording and reproducing styli 113 and 114.

The translating unit will be understood to have lateral freedom of movement about the pivot stud 101 and a vertical freedom about the pivots 103; also, it will be observed that the translating unit may be shifted across the record, by moving the slide 98 on the rods 97 and 97a, to bring either stylus into engagement with the record.

The translating unit is urged by its own weight against the record, but this weight is typically greater than is desired for recording when the recording operation is carried out upon a wax-like record by a cutting action. Accordingly, part of the weight of the translating unit is counteracted by a counterbalance weight 115. Also, the vertical pivotal movement of the translating unit is damped so as to prevent undesired vibration of the unit as a whole. Preferably we obtain this damping by a sliding frictional contact incurred by movement of the unit on the pivots 103. We find moreover that the damping is improved when the force of the counterbalance weight is applied to the translating unit through a spring means. We provide a simple and effective combination of this damping and counterbalancing means by pivoting the weight to the gimbal 102 on an axis 116 which is parallel to but spaced from the axis of the pivots 103 for the translating unit. This weight is then supported pivotally by a leaf spring 117 which is secured to the end portion 105 of the frame 106 for the translating unit, there being a button 118 at the bottom of the weight to provide a localized contact with the spring. Because the pivot axis of the weight is spaced from that of the translating unit, any vertical vibration of the unit will cause the button 118 to slide on the spring 117 and introduce a resistance to that movement of the translating unit because of the friction of the sliding contact. This is highly effective in stabilizing the action of the translating unit.

It is desired during reproducing to augment the effective weight of the translating unit on the record, and this is done by a weight 119 mounted on a lever 120 which has two arms pivoted on the pivots 103 respectively. The weight 119 overlies the translating unit and may be released to move into an effective position wherein it rests on the translating unit, and may be raised above the unit into an ineffective position as is hereinafter explained.

The conditioning of the translating unit is controlled by a link 121 which connects the collar 84 to the slide 98, the link being pivoted at 122 to the collar and having a lost-motion coupling to the slide provided by a slot 123 on the link and a stud 124 on the slide which slidably engages the slot. At the rear of the slot the link carries a pin 125 which controls a lever 126 pivoted at 127 to the bracket 100. This lever is urged upwardly against the pin 125 by a torsional spring 128. The lever has a V-notch 128*a* which coacts with a cam edge 104*a* on one side 104 of the end portion of the frame 106 to center the unit laterally about the pivot 101 and to raise the unit from the record. When the hand lever is in recording position the link 121 is in a rearward position wherein the pin 125 withholds the lever 126 from the cam 104*a*; at the same time the slide is held in a rearward position by the spring 99 and the weight 119 is held raised by the engagement of the supporting lever 120 with an upstanding finger 129 of the bracket 100 (Figure 9). Thus, the translating unit rests on the record with a minimum pressure by way of the recording stylus 113. As the hand lever 88 is moved to neutral position the link 121 is moved forwardly to release the lever 126 sufficiently so that it, under influence of the spring 128, will move against the cam 104*a* and raise the translating unit from the record. This movement of the link is however not great enough to overcome the lost motion in its coupling to the slide and, as a result, the translating unit is not now shifted relative to the record also, the weight 119 is yet held in a raised position as above explained. As the hand lever 88 is moved from neutral to reproducing position the lever 126 is released slightly further against the end of rod 97 as a stop (Figure 10) and the slide 98 is moved forwardly to shift the translating unit across the record. In response to this shifting of the translating unit, the V-cam 104*a* is moved past the lift lever 126 to lower the translating unit onto the record. By this shifting and lowering of the translating unit the reproducing stylus is engaged with the record. Also, as an incident to the shifting of the unit the lever 120 is moved free from the finger 129 to lower the weight 119 onto the unit and thus to augment the pressure of the stylus on the record. As the hand lever 88 is returned from reproducing to recording position, the sequence of operations is reversed: the unit and weight 119 being raised and shifted rearwardly as the hand lever is moved to neutral position and the unit being lowered but the weight being maintained in raised position as the hand lever is moved from neutral to recording position.

The embodiments of our invention hereinabove particularly described are intended to be illustrative and not limitative of our invention as the same are subject to changes and modifications without departure from the scope of our invention, which we endeavor to express according to the following claims.

We claim:

1. In a combined phonographic recorder and reproducer: the combination of a frame, a slide on said frame, a translating unit universally pivoted to said slide, a weight universally pivoted also to said slide and movable relative to said translating unit from a resting position thereon into a disengaged ineffective position thereabove, a counterbalance for said translating unit pivotally supported by said weight so as to be effective only when said weight is in disengaged position, means for moving said slide to shift said translating unit between recording and reproducing positions, and means controlled by said moving means for disengaging said weight from said translating unit as said unit is placed into recording position and for releasing said weight into a resting position on said unit as the latter is placed into reproducing position.

2. In a combined phonographic recording and reproducing device including a universally-pivoted translating unit, a biasing member for said unit movable between effective and ineffective positions, and means for moving said unit between recording and reproducing positions: the combination of a counterbalance for said unit pivotally supported by said biasing member and effective only when the biasing member is in ineffective position, and means coupled to said moving means and operated as said unit is shifted into recording position for moving said biasing member to ineffective position and rendering said counterbalance effective, said means being operated as said unit is shifted into reproducing position to restore said biasing member into effective position and rendering said counterbalance ineffective.

3. In a combined recording and reproducing device adapted for coaction with a moving record: the combination of a movably-mounted translating unit biased towards the record, a biasing member for said unit movable into effective and ineffective positions relative thereto, a movably-supported weight, means pivotally connecting said weight to said biasing member for augmenting the biasing force of said member on said unit when the biasing member is in effective position, and means coupling said weight to said unit for counterbalancing partially the biasing force of the unit against said record when the biasing member is in ineffective position.

4. In a translating device including a movably-supported translating unit adapted for recording on and reproducing from a moving record, said unit being biased towards the record: a mechanism for selectively increasing and decreasing the biasing force of said unit on the record comprising a first biasing member mounted for movement relative to said unit and urged into an effective position wherein it increases the biasing force of said unit on the record, and a second biasing member pivotally supported by said first biasing member and coupled to said unit for decreasing the biasing force of said unit on the record when said first biasing member is held in ineffective position.

5. In a phonographic translating device adapted for selectively recording on and reproducing from a moving record: the combination of a translating unit biased towards the record; a universal mounting for said unit including a pivot axis parallel to said record and a second pivot axis at right angles thereto; a first biasing member for said unit carried by said universal mounting on said first-mentioned pivot axis, said biasing member being movable between effective and ineffective positions relative to said unit; a second biasing member pivotally supported by said first biasing member and coupled to said unit for augmenting the biasing force of said first member when the latter is in effective position and for counteracting the biasing force of said unit on the record when said first biasing member is in ineffective position; and means for shifting said unit into recording and reproducing positions relative to the record and for concurrently moving said first biasing member into ineffective and effective positions respectively.

6. In a phonographic translating device adapted for selectively recording on and reproducing from a moving record, including a frame: the combination of a sound box including a diaphragm and recording and reproducing styli mounted on said diaphragm, said sound box being urged by its weight towards the record; means mounting said sound box on said frame for universal and rectilinear movement; means for rectilinearly shifting said mounting means to place said sound box into recording and reproducing positions relative to the record; a first biasing weight pivotally carried with said sound box for upward movement into an ineffective position and downward movement into an effective position wherein it rests on the sound box; and a counterbalance weight for said sound box pivotally supported by said biasing weight and coupled to the sound box for increasing and decreasing the biasing force of the box on the record when said first biasing weight is in effective and ineffective positions respectively.

7. In a phonographic translating device including a frame, a translating unit having recording and reproducing styli mounted on said frame for movement to place said styli selectively into engagement with a record: the combination of a first cam element fixedly mounted on said translating unit, a second cooperating cam element movably mounted on said frame, and operable to move said unit from the record, a control lever for said device having recording, neutral and reproducing positions in sequence, and means connecting said control lever to said translating unit only within one portion of a range of movement of the control lever and connecting the control lever to said second cam element only within another portion of said range, said connecting means being effective as said lever is moved from recording to neutral position to move said second cam element relative to said first element to move said unit from the record, and said connecting means being effective as said lever is moved from neutral to reproducing position to shift said unit relative to said second cam element sufficiently to disengage said cam elements from each other whereby to free the unit for movement against the record.

8. In a combined recording and reproducing device including a frame and a translating unit including recording and reproducing styli for selective engagement with a moving record: the combination of a mounting on said frame for said unit adapted to permit the unit to be shifted across the record to engage said styli selectively with the record, and to be moved towards and away from the record, means for shifting the unit, means for moving the unit towards and away from the record, a control member having recording, neutral and reproducing positions in sequence, means coupling said control member to said shifting means only within the range of movement of the control member between neutral and reproduce positions for causing the recorder and reproducer styli to be positioned for engagement with the record respectively when the control lever is in neutral and reproduce positions, and means for operating said moving means by said control member to cause said unit to be on the record when the control member is in record and reproduce positions and away from the record when the control member is in neutral position.

9. In a phonographic translating device: the combination of a frame, a translating unit pivoted to said frame on an axis for movement towards and away from the record and biased towards the record, a cantilever spring connected to said unit, and a counterbiasing means for said unit pivoted to said frame on a different axis from that of said unit and bearing slidably against a free end portion of said cantilever spring.

10. In a phonographic translating device including a frame and adapted for recording on and reproducing from a moving record: the combination of a translating unit including recording and reproducing styli, means mounting said unit on said frame for universal pivotal movement and for shifting movement across the record to place said styli selectively into engagement with the record, a control lever having recording, neutral and reproducing positions in sequence, a coupling between said lever and said unit for shifting said unit as the lever is moved from recording and reproducing positions, said coupling including a lost-motion connection which is taken up as the lever is moved from recording to neutral position without shifting the unit across the record, and means controlled by said lever in the movement thereof from recording to neutral positions for removing said unit from the record and controlled by said lever as the same is moved into reproducing position for restoring said unit onto the record.

11. In a combined recording and reproducing device adapted for coaction with a moving record and including a frame: the combination of a translating unit mounted on said frame for movement into and out of a record-engaging position; a biasing member movably mounted on said frame for movement into an effective position wherein it bears against said unit to increase the pressure thereof against the record and into an ineffective position wherein it is operatively free of said unit; a counterbalance mounted on said biasing member for movement relative thereto; and means coupling said counterbalance to said unit for rendering the counterbalance effective to reduce the pressure of the unit on the record only when said biasing member is in said ineffective position.

12. In a phonographic translating device adapted for selectively recording on and reproducing from a moving record, including a frame: the combination of a translating unit pivotally connected to said frame and biased towards the record, said unit including recording and reproducing styli; a movably-mounted control member; means having a lost-motion coupling with said unit for shifting said unit across the record to engage selectively said styli with the record only as said control member is moved through one portion of its movement range; cam means for raising said unit from the record including a first cam element on said unit and a second cooperating cam element movably mounted on said frame; and means operated by said control member as the same is moved through a remaining portion of its range for causing said second cam element to be moved into engagement with said first element to raise said unit from the record, said shifting means being adapted to disengage said cam elements and return the unit onto the record as said control member is moved through said one portion of its range.

CHARLES HUENLICH.
HARRIET GRAMANN SCHWARZ,
*Executrix of the Estate of Heinrich F. M. Gramann, Deceased.*

REFERENCES CITED

The following references are of record in the file of this patent:

UNITED STATES PATENTS

| Number | Name | Date |
|---|---|---|
| 467,530 | White | Jan. 26, 1892 |
| 874,973 | Macdonald | Dec. 31, 1907 |
| 1,067,530 | Lindstrom | July 15, 1913 |
| 1,093,732 | Scully | Apr. 21, 1914 |
| 1,100,024 | Macdonald | June 16, 1914 |
| 1,203,666 | Walker | Nov. 7, 1916 |
| 1,420,316 | Holland | June 20, 1922 |
| 2,266,781 | Lucarelle et al. | Dec. 23, 1941 |
| 2,446,324 | Di Ghilini | Aug. 3, 1948 |
| 2,545,652 | Dann et al. | Mar. 20, 1951 |